United States Patent [19]

Holmes

[11] Patent Number: 4,769,820
[45] Date of Patent: Sep. 6, 1988

[54] MEANS FOR AND METHOD OF IMPROVING TRANSMISSION OF A DATA CARRYING LASER BEAM

[75] Inventor: Richard B. Holmes, Melrose, Mass.

[73] Assignee: AVCO Research Laboratory, Inc., Everett, Mass.

[21] Appl. No.: 109,000

[22] Filed: Oct. 16, 1987

[51] Int. Cl.[4] .................................................. H01S 3/00
[52] U.S. Cl. ........................................ 372/33; 372/21; 372/64; 372/9; 372/28
[58] Field of Search ..................... 372/33, 64, 9, 28, 21

[56] References Cited

U.S. PATENT DOCUMENTS

| | | |
|---|---|---|
| 4,005,935 | 2/1977 | Wang . |
| 4,220,928 | 9/1980 | Bloom et al. . |
| 4,233,571 | 11/1980 | Wang et al. . |
| 4,306,195 | 12/1981 | Stappaerts . |
| 4,321,550 | 3/1982 | Evtuhov . |
| 4,344,042 | 8/1982 | Hon . |
| 4,389,617 | 6/1983 | Kurnit . |
| 4,500,855 | 2/1985 | Feinberg . |

Primary Examiner—Leon Scott, Jr.
Attorney, Agent, or Firm—Melvin E. Frederick

[57] ABSTRACT

At the receiving end or point at which a data or information carrying seed laser beam is to be received after traveling through a medium, a pump laser beam is propagated through the medium to the sending end of the medium at which point the now aberrated pump laser beam may be amplified if necessary and directed to and propagated through a waveguide composed of a suitable third order optically nonlinear medium. The data carrying seed laser beam is directed to and through the waveguide where it is phase conjugated and then through the medium in the direction opposite to that of the pump laser and arrives at the receiving end as an unaberrated laser beam. The data carrying laser beam and the pump laser beam have a frequency difference equal to the Stokes frequency shift of the waveguide material.

16 Claims, 1 Drawing Sheet

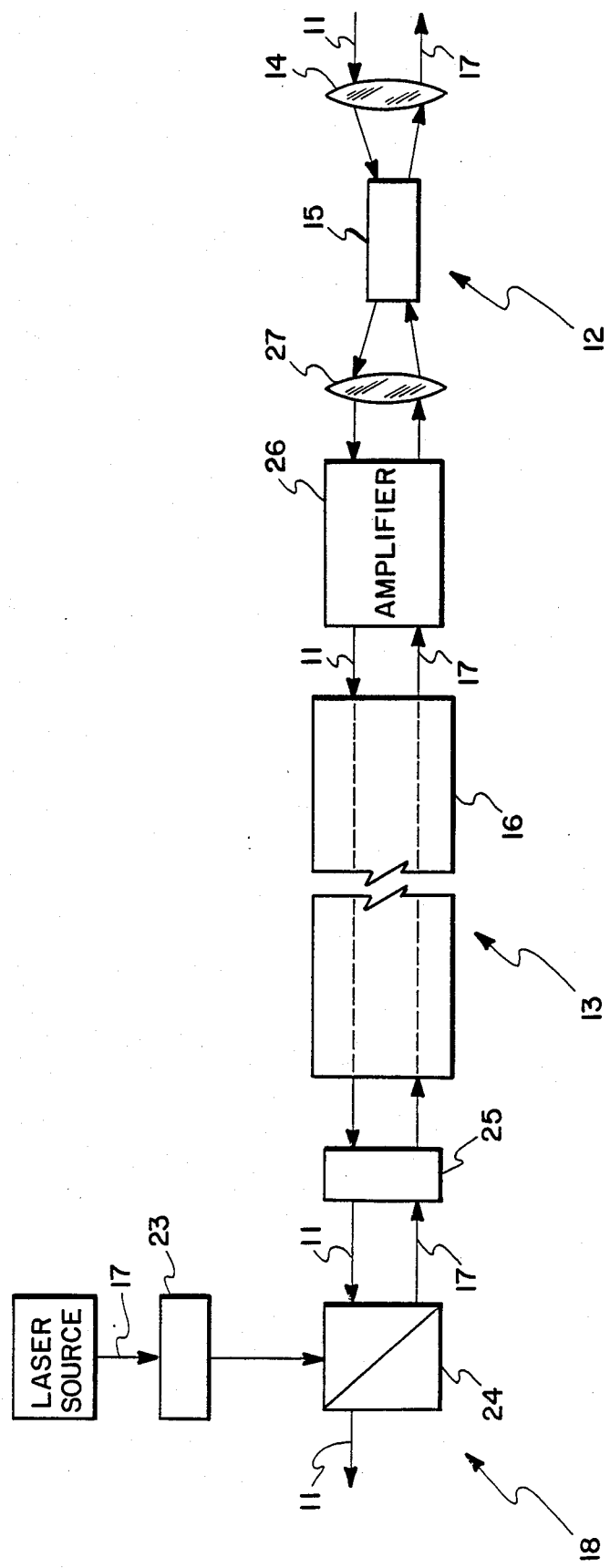

MEANS FOR AND METHOD OF IMPROVING TRANSMISSION OF A DATA CARRYING LASER BEAM

BACKGROUND OF THE INVENTON

This invention relates generally to the laser art and more particularly to means for and a method of producing a phase conjugated data-carrying laser beam with predetermined temporal modulation.

It is well known that for any laser beam propagating through a medium there can exist a time-reversed replication of that wave. Thus, an appropriately patterned laser beam can travel through a light-scattering and/or distorting medium and merge as a laser beam having a uniform wave front, provided it is a replica, reversed in time, of a wave that was originally deformed by the same medium. Such a laser beam having a time reversed wave front is generally referred to as a phase conjugated laser beam.

It is also well known that phase conjugated laser beams can be generated by nonlinear effects in an irradiated medium. For example, nearly time-reversed laser beams have been obtained by stimulated Brillouin scattering of laser beams of high optical intensity. Phase conjugation has also been obtained using the photorefractive effect in selected materials.

Phase conjugation by four-wave mixing also been performed using single-domain crystalline barium titanate as the nonlinear mixing material. However, these procedures require external pumping of the barium titanate by counterpropagating laser beams in the same manner as earlier four-wave conjugators. Therefore, it is desirable in many applications to provide a compact and versatile apparatus for phase conjugation.

Prior art phase conjugation means may employ apparatus which implements the phase conjugation by four distinct processes: namely; stimulated Brillouin scattering, four-wave mixing, three-wave mixing, or photon echoes. Apparatus for implementing the phase conjugation by stimulated Brillouin scattering requires a nonlinear medium which is capable of undergoing stimulated Brillouin scattering. Three-wave mixing apparatus employs a second-order nonlinear medium and a laser oscillator operating at a predetermined frequency. The laser light interacts with the nonlinear medium and a second light beam to provide a phase-conjugated version of the second light beam. Four-wave mixing apparatus incorporates a third-order nonlinear medium, and at least one laser operating at a predetermined frequency. The laser light is imposed on the medium from at least two different directions and interacts with a third beam and the nonlinear medium. The third beam is then phase-conjugated. Photon echo apparatus essentially is comprised of a second laser operating at a predetermined frequency, and a nonlinear medium, the nonlinear interaction being substantially different from the nonlinear media of the other embodiments.

As will not be apparent, phase conjugation is the process by which a first laser beam is given a transverse phase profile identical to that of a second laser beam traveling in the direction opposite to that of the first laser beam. Transmission of laser beams a long distance through air or the like will result, for example, in significant beam spread because of turbulence, diffraction, thermal blooming and aerosol scattering. The laser beam will also suffer significant distortion.

The occurrence of such above noted effects makes data transmission by a laser beam difficult. However, as noted hereinabove, by pre-distorting the data carrying laser beam, it is possible to transmit this laser beam so that it arrives at least substantially unaberrated at its target or receiver with no beam spread and/or distortion. Pre-distortion or phase conjugation is useful in, for example, data links, satellite communication links, ground based laser beam transmission over free space, imaging lidar and the like.

SUMMARY OF THE INVENTION

It is an object of the invention to provide means for and a method of providing compact and versatile apparatus for phase conjugation of a data-carrying laser beam with predetermined temporal modulation.

It is also an object of the invention to provide a phase conjugation system which is particularly adaptable for use with data links.

It is another object of the invention to provide a new and improved method and apparatus for compensating for the defocusing and distortional effects of phase perturbations encountered along the transmission path of a laser beam with predetermined temporal modulation.

In accordance with these and other objects of the invention there is provided apparatus wherein at the receiving end or point at which a data or information carrying laser beam is to be received after traveling through a medium, a pump laser beam is propagated through the medium to the sending end of the medium at which point the now aberrated pump laser beam may be amplified if necessary and directed to and propagates through a waveguide composed of a suitable third order optically nonlinear medium. The data carrying seed laser beam is directed to and through the waveguide where it is phase conjugated and then through the medium in the direction opposite to that of the pump laser and arrives at the receiving end as an unaberrated laser beam. The data carrying seed laser beam and the pump laser beam have a frequency difference equal to the Stokes frequency shift of the waveguide material.

BRIEF DESCRIPTION OF THE DRAWINGS

The drawing shows a generalized block diagram of a phase conjugation system in accordance with the invention.

DETAILED DESCRIPTION OF THE INVENTION

Referring now to the drawing there is shown by way of example a laser phase conjugation system in accordance with the invention that may provide laser beam transmission over a distance which may be water, free space, a fiber optics or other transmission line, a metal or plastic pipe or the like.

For purposes of simplicity and convenience of description, it is assumed that a data carrying laser beam 11 is to be generated in conventional manner (not shown) and supplied to the input end 12 at the right side of the drawing. The data carrying laser beam 11 should be a modulated monomode laser beam with a bandwidth appropriate to the nonlinear medium used, and may be temporally intensity-modulated to comprise digitized information. In the case of use of lithium niobate as the nonlinear medium, the laser beam should have a bandwidth of less than about 200 GHz. The data carrying laser beam 11 is to be transmitted over a long distance designated generally by the numeral 13 of as much as one kilometer or more. As previously noted this distance may be free space, water, a metal or plastic pipe or the like. For purposes of convenience a pipe 16 is shown in the drawing and through which the laser beams are transmitted. In the case of a pipe 16, it may be at least about five centimeters in diameter with an interior surface that is over its entire length 94% or more reflective. The data carrying laser beam 11 (as well as the pump laser beam more fully discussed hereinafter) should be of optical wavelength and be circularly polarized if a round pipe or the like is used or linearly polarized parallel to a pair of walls if a pipe or the like is used that is rectangular in cross section. Polarization is not material if no pipe or its equivalent is used. Further, the data-carrying laser beam should be a low power laser beam of, for example, less than about 0.010 watts per square centimeter.

The data carrying seed laser beam 11 (hereinafter referred to as the carrier laser beam) is received by a focusing lens 14 and focused into and transmitted through a waveguide 15. Assuming a transmission pipe of about five centimeter diameter is used, the waveguide may have a diameter of about 0.5 millimeters or less, be about one hundred centimeters long and be formed of, for example, lithium niobate. The cross section of the waveguide should have the same configuration as that of a pipe or the like if one is used. The waveguide 15 is composed of a suitable third order optically nonlinear medium such as, for example, alcohol, benzene, sulphur hexafluoride or lithium niobate.

A pump laser beam 17 generated in conventional manner is supplied to the system at the output end designated generally by the numeral 18, which is to say the left side of the drawing. The carrier laser beam 11 and the pump laser beam 17 have a frequency difference equal to the Stokes frequency shift of the waveguide material. Thus, where lithium niobate is used as the nonlinear medium, pump laser beam 17 may be have a frequency of about $7.74 \times 10$ Hz greater than that of the carrier laser beam 11, have a temporal band width substantially less than that of the carrier laser beam 17 and be generated by a narrow-band laser. The pump laser beam 17 is provided with the appropriate polarization (if needed) by a polarizer 23 received by beam splitter 24, directed by beam splitter 24 to polarizer 25, passes through polarizer 25 (if needed) and transmitted as a diffraction limited plane wave beam to the receiving end, in this case, through a pipe 16 or the like. Where needed, polarizer 23 polarizes the pump beam so that it will be directed by the beam splitter 24 toward pipe 16. At the end remote from the beam splitter 24 the pump laser beam 17 is supplied to a laser amplifier 26 and amplified to about one watt or more per square centimeter over an area of about one hundred square centimeters. The amplified pump laser beam, now distorted as a result of its transmission through the medium through which the carrier laser beam is to travel, is then focused, as by a focusing lens 27 into the left hand end of the waveguide 15. The distortion and/or aberrations imparted to the pump laser beam 17 as a result of its transmission first through the medium and then through the amplifier 26 are imposed by phase conjugation through backward stimulated Raman amplification or stimulated Brillouin amplification in the waveguide 15 on the carrier laser beam passing through the waveguide 15 in a direction opposite to that of the pump laser beam 17. The now phase conjugated carrier laser beam 11 now passes through the amplifier 26 and, if necessary, may be reduced in intensity by a filter or the like (not shown) operational on the carrier laser beam but not on the pump laser beam. The phase conjugated carrier laser beam 11 now passes through the pipe 16 or the like and arrives at and passes through the beam splitter 24 as a diffraction limited plane wave suitable for retransmission through another pipe or the like or otherwise utilized in any manner desired. Polarizer 25 is effective (where necessary) to polarize only the carrier beam emerging from pipe 16 so that it will pass directly through the beam splitter 24. The laser beam exiting from each end of the waveguide 15 is diffracted. Accordingly, focusing lens 27 is effective to focus into the waveguide 15 the pump laser beam 17 exiting from the amplifier 26 and focusing lens 14 is effective to focus into the other end of the waveguide 15 the incoming carrier laser beam 11. With repeated stations as described above, a carrier laser beam may be transmitted over many kilometers without distortion or aberrations at data rates of about 200 GHz more or less depending on the nonlinear material used.

It is to be understood that the above-described embodiments of the invention are merely illustrative of the many possible specific embodiments which represent applications of the principles of the present invention. Numerous and varied other arrangements can readily be devised in accordance with these principles by those skilled in the art without departing from the spirit and scope of the invention.

What I claim is:

1. A method of compensating for aberrations of a data carrying carrier laser beam resulting from travel along a given path through at least one medium having a carrier beam input end and a carrier beam output end, comprising:
   (a) generating a pump laser beam having a predetermined frequency;
   (b) introducing said pump laser beam to said medium output end and directing it along said given path to said medium input end;
   (c) amplifying said pump laser beam at said medium input end;
   (d) directing said amplified pump laser beam to and through a waveguide comprising a third order optically nonlinear material having a predetermined bandwidth and a predetermined Stokes frequency shift;
   (e) generating a data-carrier laser beam having a frequency equal to said pump laser beam frequency less said Stokes frequency shift;
   (f) directing said carrier laser beam to and through said waveguide in a direction opposite to that of said pump laser beam whereby said carrier and pump laser beams travel through said waveguide in opposite directions; and
   (g) directing said carrier laser beam exiting from said waveguide along said given path to said outlet end.

2. The method as defined in claim 1 wherein said carrier laser beam is generated as a monomode laser beam having a bandwidth corresponding to the bandwidth of said nonlinear material and temporally intensity modulating said carrier laser beam to define digitized data.

3. The method as defined in claim 2 wherein said pump laser beam is generated as a monomode laser beam having a bandwidth less than that of said carrier laser beam and a frequency greater than that of said carrier laser beam by an amount "substantially" equal to the said Stokes frequency shift.

4. The method as defined in claim 3 wherein said carrier laser beam has a power density of about 0.01 watts per square centimeter.

5. The method as defined in claim 1 wherein said pump laser beam is generated as a monomode laser beam having a bandwidth less than that of said carrier laser beam and a frequency greater than that of said carrier laser beam.

6. The method as defined in claim 5 wherein said pump laser beam is generated as a monomode laser beam having a bandwidth less than that of said carrier laser beam and a frequency greater than that of said carrier laser beam by an amount which is equal to the Stokes frequency shift of said waveguide material.

7. The method as defined in claim 6 wherein said pump laser beam is amplified to have a power density greater than that of said carrier laser beam as said carrier laser beam enters said waveguide.

8. The method as defined in claim 7 wherein said waveguide is comprised of lithium niobiate and is provided with a cross section and length whereby the energy of said pump laser beam is transferred to said carrier laser beam sufficient to cause phase conjugation of said carrier laser beam.

9. Apparatus for compensation for aberrations of a data carrying carrier laser beam resulting from travel along a path through at least one medium having a carrier beam input end and a carrier beam output end, comprising:
  (a) means for generating a pump laser beam having a predetermined frequency;
  (b) means for introducing said pump laser beam to said medium output end and directing it along said given path to said medium input end;
  (c) means for amplifying said pump laser beam at said medium input end;
  (d) waveguide means comprising a third order optically-nonlinear material having a predetermined bandwidth and a predetermined Stokes frequency shift equal to the difference in frequency between said carrier and pump laser beams;
  (e) means for generating a data-carrying carrier laser beam having a frequency equal to said pump laser beam frequency less said Stokes frequency shift;
  (f) means for directing said amplified pump laser beam to and through said waveguide means;
  (g) means for directing said carrier laser beam to and through said waveguide means in a direction opposite to that of said pump laser beam whereby said carrier and pump laser beams travel through said waveguide in opposite directions; and;
  (h) means for directing said carrier laser beam exiting from said waveguide along said given path to said medium output end.

10. Apparatus as defined in claim 9 wherein means for generating said carrier beam includes further means for generating said carrier beam as a monomode laser beam with a bandwidth corresponding to the bandwidth of said nonlinear material and temporally intensity modulating said carrier laser beam to define digitized data.

11. Apparatus as defined in claim 10 wherein said pump laser beam generating means generates said pump laser beam as a monomode laser beam with a bandwidth less than that of said carrier laser beam and a frequency greater than that of said carrier laser beam by an amount equal to the said Stokes frequency shift.

12. Apparatus as defined in claim 11 wherein said carrier laser beam is generated with a power density of about 0.01 watts per square centimeter.

13. Apparatus as defined in claim 9 wherein said pump laser beam generating means generates said pump laser beam as a monomode laser beam with a bandwidth less than that of said carrier laser beam and a frequency greater than that of said carrier laser beam.

14. Apparatus as defined in claim 13 wherein said means for generating said pump laser beam includes further means for generating said pump laser beam as a monomode laser beam with a bandwidth less than that of said carrier laser beam and a frequency greater than that of said carrier laser beam by an amount which is equal to the Stokes frequency shift of said waveguide material.

15. Apparatus as defined in claim 14 wherein said amplifier means amplifies said pump laser beam to have a power density greater than that of said carrier laser beam as said carrier laser beam enters said waveguide.

16. Apparatus as defined in claim 15 wherein said waveguide is comprised of lithium niobiate and has a cross section and length whereby a portion of the energy of said pump laser beam is transferred to said carrier laser beam and said carrier laser beam is phase conjugated.

* * * * *